June 26, 1934.  P. HINTZ  1,964,635
METHOD AND MACHINE FOR MAKING BASKETS
Filed Sept. 12, 1933  2 Sheets-Sheet 1

Inventor
PAUL HINTZ.
By Sturtevant, Mason + Porter
Attorneys

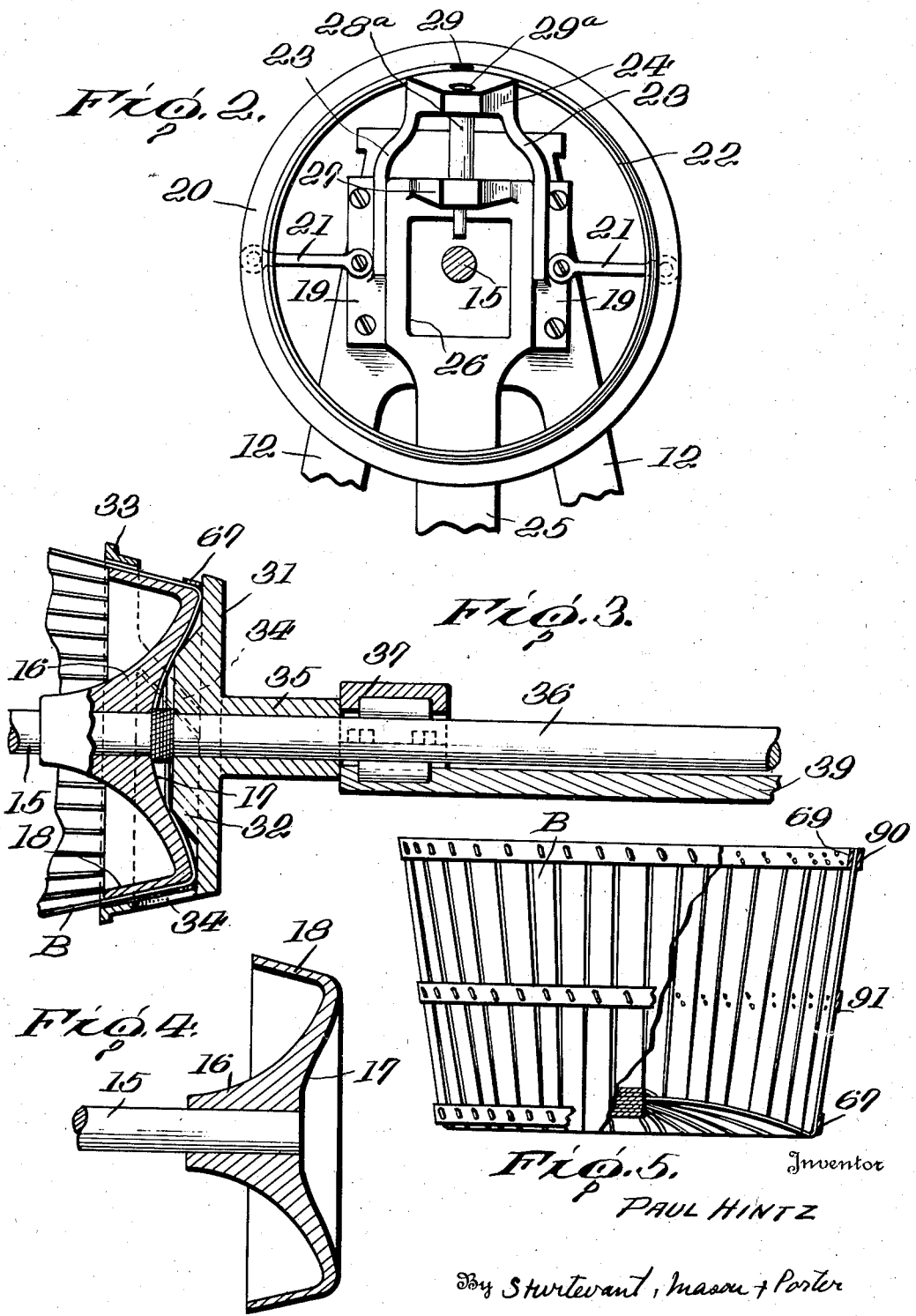

Patented June 26, 1934

1,964,635

UNITED STATES PATENT OFFICE 1,964,635

METHOD AND MACHINE FOR MAKING BASKETS

Paul Hintz, Marshall, Tex., assignor to The Marshall Manufacturing Company, Marshall, Tex., a corporation of Texas Application September 12, 1933, Serial No. 689,147

13 Claims. (Cl. 147—47)

The present invention relates to improvements in the art of making baskets, and more particularly relates to an improved method and machine for making baskets of the type wherein a mat portion, consisting of a plurality of crossed flat staves, is adapted to be formed into basket shape and secured by a number of hoops.

An object of the present invention is to provide an improved method of making baskets of the type referred to, wherein a reinforcing hoop is first applied to the basket bottom and wherein the central part of the basket wall is held rigid so that any irregularities will be gradually eliminated toward the free ends of the staves.

Another object of the invention is to provide an improved method of making baskets wherein a flat mat portion is formed into basket shape and wherein a preformed hoop is applied to the mat portion during the completion of the basket forming operation whereby the said preformed hoop aids in finally shaping and holding the mat portion in basket shape.

A further object of the invention is to provide an improved basket making machine for carrying out the present method wherein a former is adapted to support a preformed hoop and to cooperate with a mandrel in order to form the mat portion into basket shape and to properly position the preformed hoop on the basket wall.

A still further object of the present invention is to provide, in a basket making machine of the type referred to, an improved mandrel consisting of a stationary part and a rotatable part and an improved former which is adapted to cooperate with the mandrel in forming the mat portion into basket shape and which is adapted to freely rotate with the rotatable part of said mandrel when in frictional engagement therewith and with the mat portion interposed therebetween.

The invention still further aims to provide an improved basket making machine, of the type referred to, wherein a mechanical clincher device operating between the stationary and rotatable parts of said mandrel is adapted to cooperate with stapling devices whereby the basket is secured together.

The invention still further aims to provide an improved basket making machine, of the type referred to, which is efficient in operation and the parts of which are readily accessible for adjustment or repair.

These and other objects of the invention will in part be obvious and will be hereinafter more fully described.

In the drawings:

Fig. 2 is an enlarged view, showing the mounting of the non-rotating part of the mandrel and of the anvil member.

Fig. 3 is an enlarged view, showing the relative positions of the mandrel and former at the completion of the forming operation.

Fig. 4 is a sectional view of the rotatable part of the mandrel.

Fig. 5 is a view of the completed basket.

Figure 1:
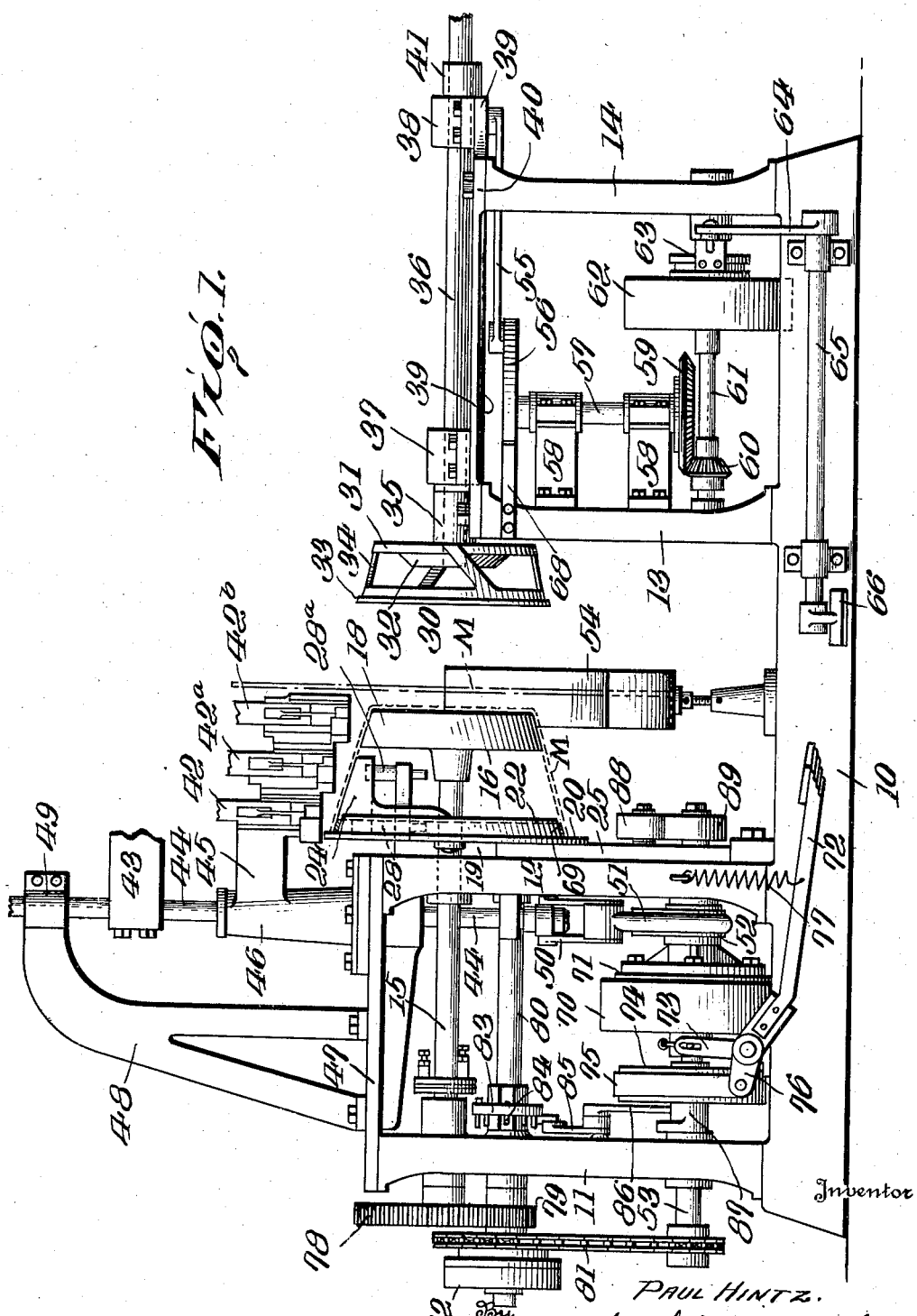
Fig. 1 is a side elevation, showing the entire machine in position before the forming operation has begun.

Referring in detail to the accompanying drawings, it will be noted that the entire machine is mounted on a base 10 on which are secured upright bracket or frame members 11, 12, 13, 14. A shaft 15 is journaled in the brackets 11, 12 and the ends thereof extend beyond the said brackets. Between the brackets 12 and 13 a disk member 16 is fixedly mounted on one end of the shaft 15 for rotation. The disk or drum member 16 is provided with a central recess 17 on the outer face thereof and a tapered wall portion 18 which extends toward the bracket frame 12. Secured to the frame 12 and spaced from the disk member 16 are two guide pieces 19. A ring 20, having a vertical face, is rigidly secured to the guide pieces 19 by arms 21. A second ring 22, having a tapered surface corresponding to the tapered wall portion 18 of the disk 16, is also rigidly secured to the frame. The leg portions 23 of an anvil member 24 are fixedly secured to the guide pieces 19. The anvil member 24 has a tapered surface which coincides with the surfaces of the ring 22 and the wall portion 18 of the disk member 16. A bar 25 has an enlarged head portion which is provided with an opening 26, the walls of which are spaced from the shaft 15 in order to permit the bar to reciprocate without interfering with the shaft. An angular projection 27 on the head portion of the bar 25 carries two clincher members 28, 28a which are secured thereto. The clincher members 28, 28a are adapted to reciprocate with the bar 25 within openings 29, 29a, respectively, in the anvil member 24.

A former 30, mounted for endwise shifting and for free rotation, includes a base portion 31 having a protruding portion 32 which is adapted to cooperate with the recess 17 in the member 16 to form a concave basket bottom. A ring 33 is secured in spaced relation to the base portion 31 by angle arms 34. A sleeve 35 on the base portion 31 is fixedly secured to a shaft 36 which is free to rotate in bearings 37, 38, which, in turn, are fixed to a carriage 39. The carriage 39 is mounted for endwise shifting on a trackway 40 which is secured to the bracket frames 13, 14. A collar 41 is secured to the shaft 36 and abuts against the bearing 38 and, since the sleeve 35 abuts against the bearing 37, it is apparent that the shaft 36 and former 30 are constrained to move with the shiftable carriage 39, but at the same time are free to rotate in the bearings 37, 38 which are supported on the carriage.

The stapling heads 42, 42a, 42b are carried by a bracket arm 43 which is secured to a vertical shaft 44. The stapling heads are adapted to reciprocate in the guiding bracket arm 45 which is carried by a base 46. The base 46 is mounted for turning movement on a platform 47 which is secured to the upper ends of the frames 11, 12. An additional steadying bracket 48 is mounted on the platform 47 and the upper end of the shaft 44 is adapted to reciprocate in the bearing 49 therein. The shaft 44 extends downwardly through the base 46 and has a swivel connection with two arms 50 which are secured to an eccentric strap 51, which, in turn, engages an eccentric 52 on the main shaft 53.

In forming the basket the mat portion M is placed on a cradle 54 which is adjustably mounted on the machine base 10. The stapling device is swung out of the way and the mat placed with the center portion thereof against the face of the disk member 16. The carriage 39 is connected by a link 55 to a disk 56 which is mounted on a vertical shaft 57, which, in turn, is journaled in the brackets 58 on the frame 13. The lower end of the shaft 57 carries a bevel gear 59 which meshes with a bevel gear 60 on the driving shaft 61 which is journaled in the frames 13, 14. The shaft 61 carries a belt wheel 62 which may be connected to any suitable source of power. The operation of the shaft 61 from the belt wheel 62 is controlled by a clutch mechanism 63 which is operable through a lever 64, shaft 65, and pedal 66. A preformed hoop 67 is placed in the former 30 with the edge thereof abutting against the base 31 of the former and with the outer face thereof abutting against the angle arms 34. When the mat has been properly placed in the cradle 54, the operator depresses the pedal 66 which causes the clutch 63 to become engaged so that the shaft 61 is driven from the belt wheel 62. The meshing bevel gears 60, 59 cause the consequent rotation of shaft 57 and disk 56. The rotation of the disk 56 causes the link 55 to shift the carriage 39 toward the mandrel so that the ring 33 of the former 30 urges the mat over the mandrel. At the completion of the shifting movement of the carriage 39 the pedal 66 is released, thereby releasing the clutch 63 so that the rotation of shaft 61 is stopped with the mandrel and former in the position shown in Fig. 3. A leaf spring 68 engages notches in the disk 56 at the extremities of the endwise movement thereof. It will be seen that, near the completion of the movement of the former 30, the preformed hoop 67 is forced over the lower edge of the mat after it has been given a preliminary formation over the walls 18 of the member 16 so that the formed mat is given a final shaping by the hoop 67 as it is forced thereon. It will also be noted that the former ring 33 holds the staves of the mat in position after the hoop 67 has been forced on, so that buckling of the staves is effectually prevented and any irregularities are thus eliminated at the top of the basket, that is, at the free ends of the staves which constitute the mat. An inner preformed hoop 69 is, of course, placed upon the ring 22 so that the ends of the mat rest thereon at the completion of the forming operation. When the mandrel and former are in position, as shown in Fig. 3, the stapling heads are swung around to the operative position, as shown in Fig. 1. The reciprocating head 42 is in position above the clincher 28 while the head 42a is in position above the clincher 28a. The head 42b is in position above the hoop 67.

A driving wheel 70 on the main shaft 53 may be connected to any suitable source of power. The operation of the main shaft 53 from the pulley 70 is controlled by a clutch mechanism 71. The clutch is controlled by a pedal 72 which is connected to a clutch operating lever 73. A brake drum 74 on the shaft 53 has a brake band 75 associated therewith. This brake is also controlled by the pedal 72 through an extension lever 76. A spring 77 normally holds the pedal 72 in an elevated position wherein the clutch is disengaged and wherein the brake band 75 engages the drum 74 so that the shaft 53 is stationary.

The mandrel, it will be noted, consists of the stationary rings 20, 22 and the disk 16 which is adapted to be rotated by the shaft 15. The shaft 15 carries a pinion gear 78 which meshes with a pinion gear 79 on the countershaft 80. The countershaft 80 is driven by a chain 81 from the main shaft 53. A friction device 82 on the countershaft 80 permits a step by step movement to be imparted to said countershaft by an intermittent movement device. A disk 83 on the shaft 80 carries a plurality of pins 84 which engage a bell crank lever 85. This lever is pivoted to the frame 11 and the lower ends 86 thereof engages a cam 87 on the main shaft 53. Thus the friction device 82 permits the chain to slip when rotation of the countershaft is prevented by the above device. This intermittent movement is transmitted to the shaft 15 through the gears 78, 79. The bar 25, which carries the clinchers 28, 28a, has a roller 88 secured to the lower end thereof. This roller engages a cam 89 on the main shaft 53 and in this manner the clinchers are caused to reciprocate when the machine is in operation.

When the mandrel and former are in the position shown in Fig. 3 and the stapling heads have been swung into the positions shown in Fig. 1, the operator depresses the pedal 72 which permits the shaft 53 to rotate. The rotation of the shaft 53 causes the reciprocation of shaft 44 and the stapling heads which are connected thereto. At the same time, and in timed relation thereto, the bar 25 and the clincher members 28, 28a, which are carried thereby, are caused to reciprocate. The mechanism is timed so that the clinched members reach a high point at the instant the stapling heads reach a low point. The top and center hoops 90, 91 respectively are fed to the stapling device in strip form. The timing of the intermittent movement device is such that the shaft 15 and disk 16 remain stationary during the stapling operation, but as the stapling heads and clinchers go away from one another a slight turning movement of the shaft 15 and disk 16 is effected so that the hoops are advanced to a position for the next stapling operation. The stapling head 42b cooperates with the wall 18 of the disk 16 in securing the preformed hoop 67 to the basket. The basket is thus intermittently rotated in order to present a new part of the basket for each successive stapling operation, and the hoop 69 slips over the ring 22 as the basket is rotated. As the disk 16 is intermittently rotated, the former 30, too, which is in frictional engagement therewith, is free to rotate with the shaft 36 which is journaled in the bearings 37, 38. The angle arms 34 are so positioned with respect to the timed operation of the stapling head 42b that they do not interfere therewith. At the completion of all the necessary stapling, the pedal 72 is released and thus the machine is stopped promptly by the brake. Then the pedal 66 is again depressed whereby disk 56 is caused to rotate, thus shifting the carriage 39 and former 30 to the position shown in Fig. 1, so that the completed basket B may be removed from the mandrel.

It is to be noted that, after the mat is properly positioned on the cradle 54, and after the shaft 61 is rotated which causes a relative axial movement between the former and the mandrel, the approach and ultimate contact of the former ring 33 with the mat will cause a preliminary shaping of the mat over the mandrel. Near the completion of the endwise movement of the former toward the mandrel, the preformed hoop 67 will be forced over the mat portion and thus a final shaping of the mat is obtained. The forcing of the hoop 67 over the mat affords a tight sealing of the staves at this point so that any buckling or other irregularities are prevented. The former ring 33 is adapted to firmly hold the central part of the formed mat in position so that all possible irregularities are gradually eliminated at the free ends of the staves. A basket, formed in this manner, is strong and durable, inasmuch as the staves are held rigid and all buckling thereof is eliminated during the forming operation.

It is to be understood that minor changes in the operation and construction of the machine and in the carrying out of the present method may be made without departing from the scope of the invention as set forth in the appended claims.

Having thus fully described my invention, what I claim as new and desire to secure by Letters Patent is:

1. In a machine for making baskets, a mandrel including a non-rotating member and a rotatable member, a former cooperating with said mandrel to form a mat into basket shape, means for causing a relative axial movement between said former and said mandrel whereby the mat is formed on said mandrel and held thereon by said former, stapling mechanism for securing the formed mat in basket shape, and means for rotating the rotatable member of said mandrel for positioning the formed mat for stapling, said former being freely rotatable with said rotatable member during the stapling operation.

2. In a machine for making baskets, a frame, a mandrel including a stationary part secured to said frame and a rotatable member spaced from said stationary part, a former cooperating with said mandrel to form a mat into basket shape, means for causing a relative axial movement between said rotatable member and said former whereby the mat is formed on said mandrel and held thereon by said former, stapling mechanism for securing the formed mat in basket shape, and means for intermittently rotating the rotatable member of said mandrel for presenting a new portion of the formed mat for successive stapling, said former being freely rotatable with said rotatable member during the successive stapling operations.

3. In a machine for making baskets, a frame, a mandrel including a ring rigidly secured to said frame and a rotatable drum spaced from said ring, a former cooperating with said rotatable drum to form a mat into basket shape, means for causing a relative axial movement between said drum and said former whereby the mat is formed on said mandrel and held thereon by said former, stapling mechanism for securing the mat in basket shape, and means for intermittently rotating said drum for presenting a new portion of the formed mat for stapling, said former being freely rotatable with said drum during the stapling operation.

4. In a machine for making baskets, a frame, a mandrel comprising a stationary ring having a vertical face, a stationary ring having a horizontally tapered surface, said rings being rigidly secured to said frame and a rotatable drum spaced from said rings, a former cooperating with said mandrel, means for causing a relative axial movement between said drum and said former whereby the mat is formed on said mandrel and held thereon by said former, stapling means for securing the formed mat in basket shape, and means for intermittently rotating said drum to present a new portion of the formed mat for stapling, said former being freely rotatable with said drum during the stapling operation.

5. In a machine for making baskets, a mandrel including a non-rotating part and a rotatable member, a former cooperating with said mandrel to form a mat into basket shape, said former including a base portion and a spaced parallel ring member secured thereto, means for causing a relative axial movement between said mandrel and said former whereby the mat is formed on said mandrel and held thereon by said former, stapling means for securing the formed mat in basket shape, and means for intermittently rotating the rotatable member of said mandrel to position the formed mat for stapling, said former being freely rotatable with said rotatable member during the stapling operations.

6. In a machine for making baskets, a mandrel including a non-rotating part for supporting a preformed hoop and a rotatable drum spaced therefrom, a former cooperating with said mandrel to form a mat into basket shape, said former including a base portion and a ring secured in spaced parallel relationship thereto, means for causing a relative axial movement between said mandrel and said former whereby the mat is formed on said mandrel and held thereon by said former, stapling means for securing the formed mat in basket shape, and means for intermittently rotating said rotatable drum for presenting a new portion of the formed mat to said stapling means, said former being freely rotatable with said rotatable drum during the stapling operation.

7. In a machine for making baskets, a mandrel including a non-rotating part and a rotatable part, a former cooperating with said mandrel to form a mat into basket shape, means on said former for holding a preformed hoop, means for causing a relative axial movement between said mandrel and said former whereby the mat is formed and held on said mandrel by said former with the preformed hoop engaging the formed mat, stapling means for securing the formed mat and hoop in basket shape, and means for intermittently rotating the rotatable drum of said mandrel for successive stapling operations, said former being freely rotatable with said rotatable part during the stapling operations.

8. In a machine for making baskets, a frame, a mandrel including a stationary part secured to said frame and a rotatable drum spaced therefrom, a former cooperating with said drum to form a mat into basket shape, means for supporting said former for free rotation and endwise shifting, means for shifting said former into frictional engagement with said drum with the formed mat therebetween, a clincher device mounted on said frame for reciprocation between the stationary part and the rotatable drum of said mandrel, stapling means for securing the formed mat in basket shape, means for reciprocating said clincher device in timed relation to said stapling means, and means for intermittently rotating said drum to present a new portion of the formed mat for each stapling operation, said former being freely rotatable with said rotatable drum.

9. In a machine for making baskets, a frame, cooperating mandrel and former devices for forming a mat into basket shape, said mandrel device including a non-rotating part and a rotatable member, said former device including a base portion and a ring member secured in spaced relation thereto, a shaft for supporting said former device, a carriage mounted on said frame for supporting said shaft for free rotation, means for shifting said carriage to a position wherein the rotatable member of said mandrel device fits within said former device with the formed mat therebetween, said former being freely rotatable with said rotatable member, stapling means for securing the formed mat in basket shape, and means for rotating said rotatable member whereby the stapling operation is completed around the periphery of the formed mat.

10. In a machine for making baskets, a frame, a mandrel including a non-rotating member and a rotatable drum spaced therefrom, a former cooperating with said mandrel to form a mat into basket shape, an anvil member secured to said frame and positioned between said non-rotating member and said rotatable drum, said anvil having openings extending therethrough, clincher devices reciprocating within the openings in said anvil, means for causing a relative axial movement between said mandrel and said former whereby the mat is formed and held on said mandrel by said former, stapling means for securing the formed mat in basket shape, means for reciprocating said clincher devices in timed relation to said stapling means, and means for intermittently rotating said drum whereby to permit successive stapling of the formed mat, said former being freely rotatable with said drum.

11. The method of making a basket which consists in forming a mat of crossed staves, sharply bending the staves to form a substantially straight basket wall, forcing a preformed hoop over the basket wall and in contact therewith adjacent the sharp bend near the completion of the bending operation and while the ends of said staves remain unsecured whereby to finally shape the lower part of the basket and to permit the elimination of irregularities therefrom and securing the staves together to complete the basket.

12. The method of making a basket which consists in forming a mat of crossed staves, placing a preformed hoop in spaced relation to the mat, sharply bending the staves to form a substantially straight basket wall and to permit the free ends of said staves to overlie said preformed hoop, forcing a second preformed hoop over the basket wall and in contact therewith adjacent the sharp bend near the completion of the bending operation and while the ends of said staves remain unsecured whereby to finally shape the lower part of the basket and to permit the elimination of irregularities therefrom and securing the staves together to complete the basket.

13. The method of eliminating irregularities in the making of a basket which consists in forming a mat of crossed staves, sharply bending the staves to form a substantially straight basket wall, finally shaping the bottom of the basket by forcing a preformed hoop tightly over the basket wall adjacent the sharp bend while the ends of said staves remain unsecured whereby all irregularities are eliminated toward the free and unsecured ends of the staves, and securing the staves together at the completion of the shaping operations.

PAUL HINTZ.